United States Patent
Murphy

[11] Patent Number: 5,435,507
[45] Date of Patent: Jul. 25, 1995

[54] CABLE SUPPORT

[75] Inventor: Maurice W. Murphy, Lawrenceville, Ga.

[73] Assignee: The Morgan Crucible Company plc, Windsor, England

[21] Appl. No.: 210,069

[22] Filed: Mar. 17, 1994

Related U.S. Application Data

[63] Continuation of Ser. No. 965,188, Oct. 23, 1992, abandoned.

[51] Int. Cl.⁶ ............................................. F16L 3/10
[52] U.S. Cl. ................. 248/74.4; 24/135 K; 174/40 R
[58] Field of Search ............ 248/74.4, 74.5, 74.1, 248/68.1, 316.6; 174/40 R, 169; 24/135 K

[56] References Cited

U.S. PATENT DOCUMENTS

| | | |
|---|---|---|
| 1,305,713 | 6/1919 | Goddard . |
| 1,928,622 | 10/1933 | Hendee . |
| 2,026,260 | 12/1935 | Tarbox . |
| 2,058,558 | 10/1936 | Bovard . |
| 2,099,465 | 11/1937 | Burleson ................. 248/74.4 X |
| 2,236,279 | 3/1941 | Von Hoorn . |
| 3,288,409 | 11/1966 | Bethea, Jr. ............. 248/316.6 X |
| 3,437,742 | 4/1969 | Lindsey . |
| 3,555,747 | 1/1971 | Taylor . |
| 3,633,858 | 1/1972 | Houston et al. . |
| 3,940,553 | 2/1976 | Hawkins . |
| 4,159,393 | 6/1979 | Dulhunty . |
| 4,242,537 | 12/1980 | Hearnshaw . |
| 4,360,177 | 11/1982 | Dulhunty . |
| 4,727,224 | 2/1988 | Kellett et al. . |
| 4,741,097 | 5/1988 | D'Agati et al. . |
| 5,014,941 | 5/1991 | Sherman . |
| 5,195,704 | 3/1993 | Louie .................... 248/74.4 |

OTHER PUBLICATIONS

Brochure of Dulmison, Inc. entitled "Fiber Optic Hardware", four pages (available no later than Oct. 22, 1992).
Brochure of Dulmison, Inc. entitled "Spacer & Spacer Damper Products", six pages (available no later than Oct. 22, 1992).
Brochure of Dulmison, Inc. entitled "The Dobgone Vibration Damper", six pages, (available no later than Oct. 22, 1992).
Untitled corporate brochure of Dulmison, Inc., 24 pages (available no later than Oct. 22, 1992).
Brochure of Tranpol Internationa, Inc. entitled "Hether-Lite TM Distribution Insulator Products", 24 pages (available no later than Oct. 22, 1992).

*Primary Examiner*—Rinaldi I. Rada
*Attorney, Agent, or Firm*—Dean W. Russell; Kilpatrick & Cody

[57] ABSTRACT

An easily-installable support capable of accommodating a wide variety of fiber optic cables is disclosed. The fiber optic cable support uses a one-piece, variable diameter mechanism for cushioning and spacing the supported cable. The support is also contoured to increase the surface area available to contact a utility pole or other structure and includes one or more cleats or gains which provide additional contact strength by biting into and gripping wooden or similar poles. The support is designed to provide approximately constant compressive pressure to the supported sections of a length of cable and sufficient pressure to avoid the need to apply grit or other loose friction-increasing substances to the cushion interior. Because it is of relatively constant or slowly varying cross-section, the support can be die formed with minimal disruption of the fluid flow within the die.

18 Claims, 2 Drawing Sheets

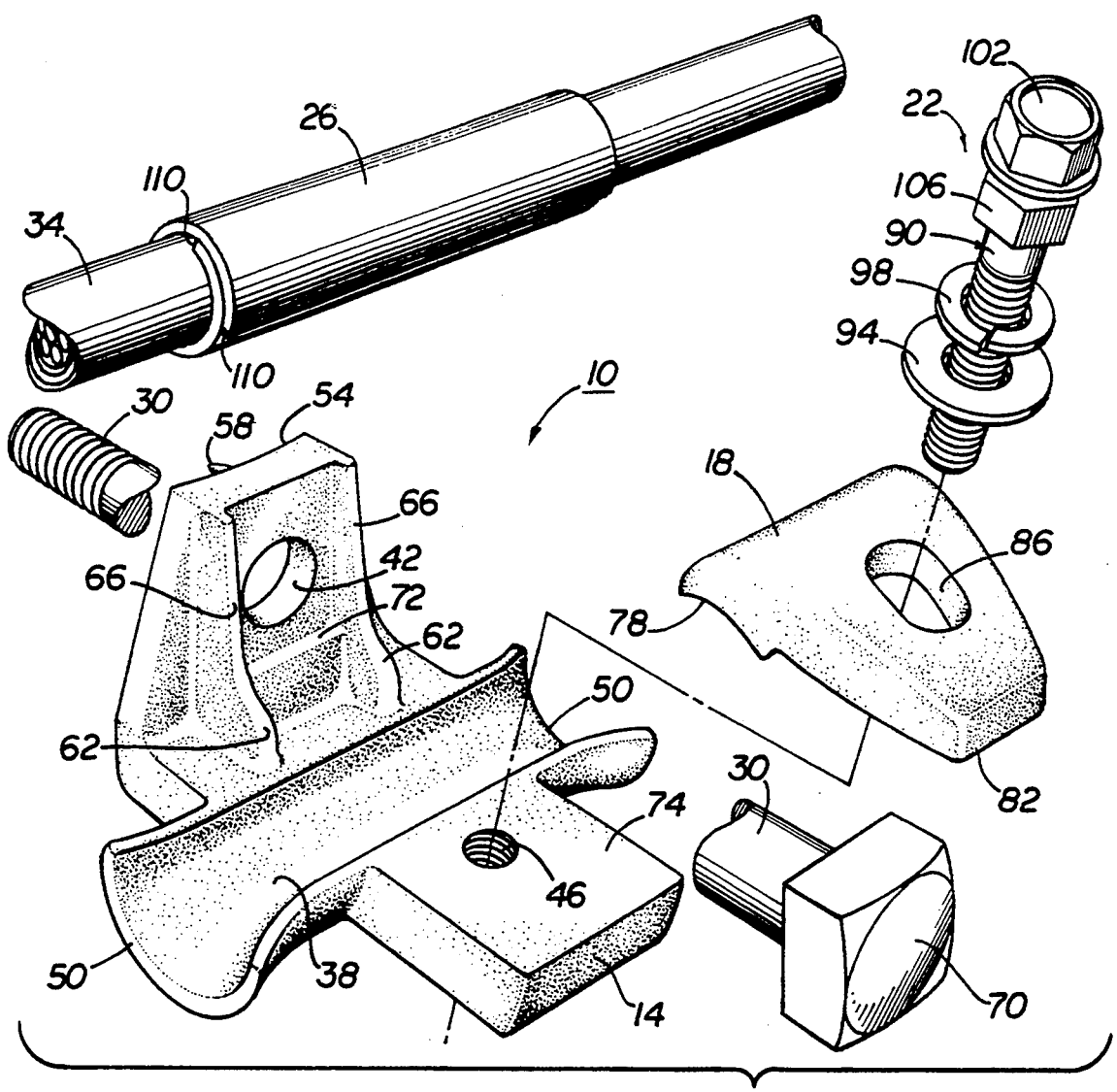
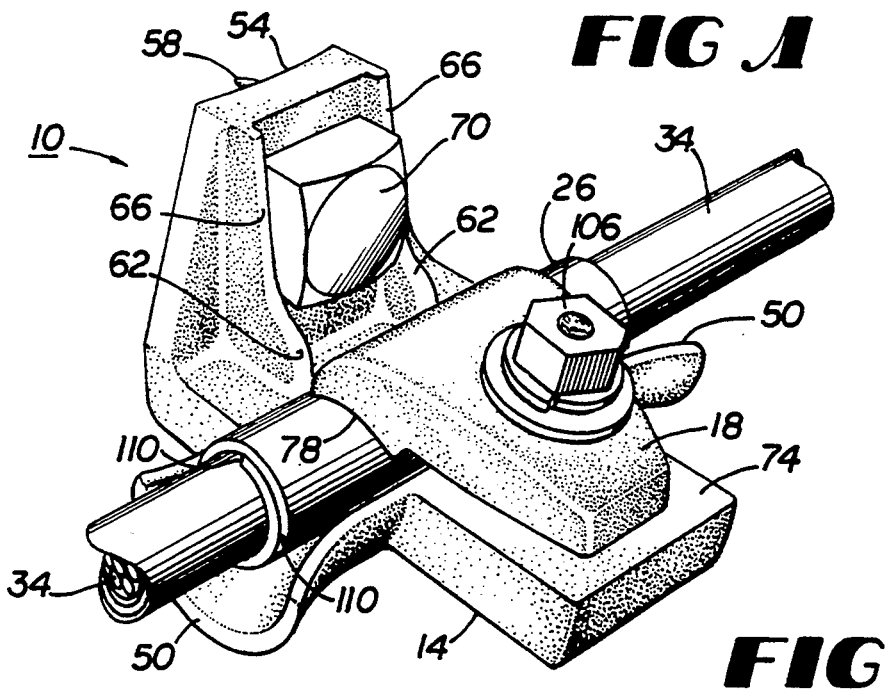

CABLE SUPPORT

This is a continuation of copending application Ser. No. 07/965,188 filed on Oct. 23, 1992, now abandoned.

This invention relates to apparatus for stringing and supporting cables, particularly fiber optic cables.

BACKGROUND OF THE INVENTION

Numerous assemblies have been designed to support conventional cables having electrical conductors. U.S. Pat. Nos. 2,058,558, 3,437,742, and 4,727,224 illustrate three such assemblies, each including a body for receiving the cable and a clamping head or jaw secured by a bolt. U.S. Pat. No. 3,633,858 discloses a similar clamping assembly using a leaf spring as part of the clamping member.

These and other supports for conventional electrical cables are typically unsuitable for use with fiber optic cables, however. Because these optical cables lack the strong metallic conductors of standard electrical cables, they are more fragile and easily damaged or crushed. Cable damage can, in turn, degrade the overall effectiveness of the optical fibers as a transmission medium, in many cases necessitating repair or replacement of the damaged section.

U.S. Pat. No. 5,014,941 ("the Sherman patent"), incorporated herein in its entirety by this reference, discusses additional difficulties associated with stringing and supporting fiber optic cables. Among these are mechanical problems in gripping the cables and flexural fatigue resulting from dynamic stresses caused by cable oscillation. Static stresses related to suspending the relatively fragile cable at only selected points along its length additionally contribute to cable fatigue.

The Sherman patent accordingly presents a fiber optic cable support assembly designed to address these difficulties. As described in the Sherman patent, the assembly includes two rigid dielectric body portions defining a central bore. The bore receives a two-piece cushion, which in turn receives and contacts the fiber optic cable. An internally threaded aperture in one body portion permits the assembly to be attached to a structure having a pre-embedded fastener, although the body portion must be repeatedly rotated to attach the assembly to, for example, a utility pole. This rotation makes installing the assembly cumbersome and, obviously, precludes the assembly from receiving the cable until the pertinent body portion is attached to the pole.

The enclosed nature of the assembly disclosed in the Sherman patent dictates use of a fixed diameter bore and cushion. Assemblies designed according to the Sherman patent also require application of grit to the cushion to increase the coefficient of friction between the cushion and cable and thereby reduce cable slippage. Combined, these requirements restrict the flexibility of each particular assembly, effectively limiting its use to a single size fiber optic cable. The enclosed assembly and cumbersome installation requirements also diminish access to the cable for repairs or replacement once installed. Further, the flat surface of the assembly's enlarged boss reduces the surface area available to contact a curved structure (again, such as a utility pole) during installation, decreasing the strength of the connection between them.

SUMMARY OF THE INVENTION

The present invention provides an easily-installable support capable of accommodating a wide variety of fiber optic (and other) cables. Unlike the assembly of the Sherman patent, for example, the present invention utilizes a one-piece, variable diameter cushioning mechanism designed not only to distribute stresses but also to occupy any excess space between the cable and its receiving channel in the main body of the device. The fiber optic cable support of the present invention can be mounted to a utility pole without being rotated and is contoured to increase the surface area available to contact with the pole. The cable support also includes one or more cleats or gains, which provide additional contact strength by biting into and gripping wooden poles.

A metal (or other appropriate) arcuate keeper additionally assists the main body in accommodating numerous-diameter fiber optic cables, providing sufficient compressive strength to avoid the need to apply grit or other loose friction-increasing substances to the cushion interior. Use of a two-headed bolt to fasten the keeper to the main body of the support permits the outer head to be sheered off during installation. In the present invention, the bolt is designed so that the outer head breaks away when the cable has been subjected to an appropriate compressive force, assuring a relatively constant installation pressure along the length of the fiber optic cable. The present invention also permits rapid access to the cable merely by loosening the bolt and rotating the keeper away from the cable, can be die formed, and is of relatively constant or slowly varying cross-section to facilitate metal or other fluid flow inside the die.

It is therefore an object of the present invention to provide a support capable of accommodating a variety of fiber optic cable sizes.

It is an additional object of the present invention to provide a one-piece, variable diameter cushioning mechanism for protecting different sizes of fiber optic cable.

It is another object of the present invention to provide an easily-installable and accessible support with a minimum number of loose or cumbersome parts.

It is yet another object of the present invention to provide a fiber optic cable support contoured and configured to present a large surface area for contact with a curved structure (such as a utility pole) and including gains for biting into and gripping wooden poles.

It is a further object of the present invention to provide a support adapted to supply relative constant compressive pressure to the supported sections of the fiber optic cable.

It is another object of the present invention to provide a fiber optic cable support easily formed within a die.

Other objects, features, and advantages of the present invention will become apparent with reference to the remainder of the written portion and the drawings of this application.

BRIEF DESCRIPTION OF THE DRAWINGS

FIG. 1 is an exploded perspective view of the cable support of the present invention shown together with a portion of a fiber optic cable.

FIG. 2 is a perspective view of the cable support of FIG. 1 shown partially installed.

DETAILED DESCRIPTION

Figure 3:
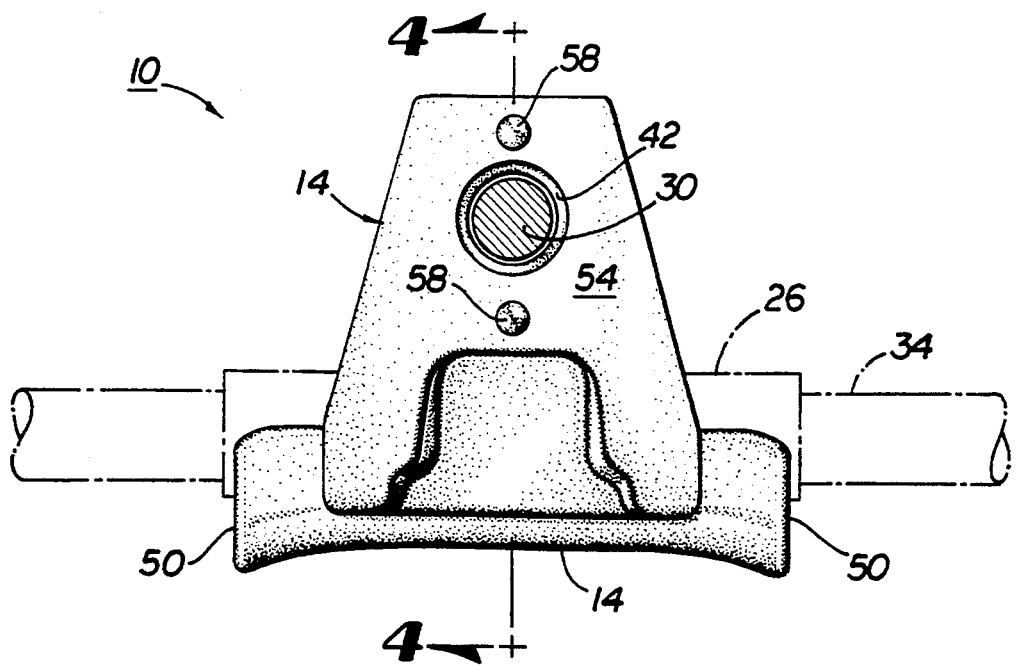
FIG. 3 is an elevational view of the cable support of FIG. 1.

FIGS. 1-4 illustrate an embodiment of cable support 10 of the present invention. Cable support 10 generally includes body 14, keeper 18, and fastener 22. Also shown in FIGS. 1-4 are cushion 26 and (through) bolt 30, as well as a portion of a fiber optic cable 34. Cable support 10 is easily installed on a structure such as utility pole P and capable of accommodating a wide range and diameters of fiber optic cables. As designed, cable support 10 also permits rapid access to cable 34 when necessary or desired and can be installed in series to provide approximately constant compressive pressure along the supported length of the cable 34.

Body 14, typically (but not necessarily) made of aluminum, defines channel 38, aperture 42, and threaded bore 46. Channel 38 receives and supports cable 34 and, when appropriate, cushion 26. Channel 38 also terminates in flared ends 50, providing an increased-radius opening facilitating stringing and placement of cable 34. Aperture 42 receives bolt 30 when cable support 10 is installed on utility pole P or other structure, and bore 46 similarly receives fastener 22 during the installation process. The structure of body 14 permits it to be installed on utility pole P without having to be rotated as bolt 30 is embedded in the pole P (and an associated nut tightened).

Figure 4:
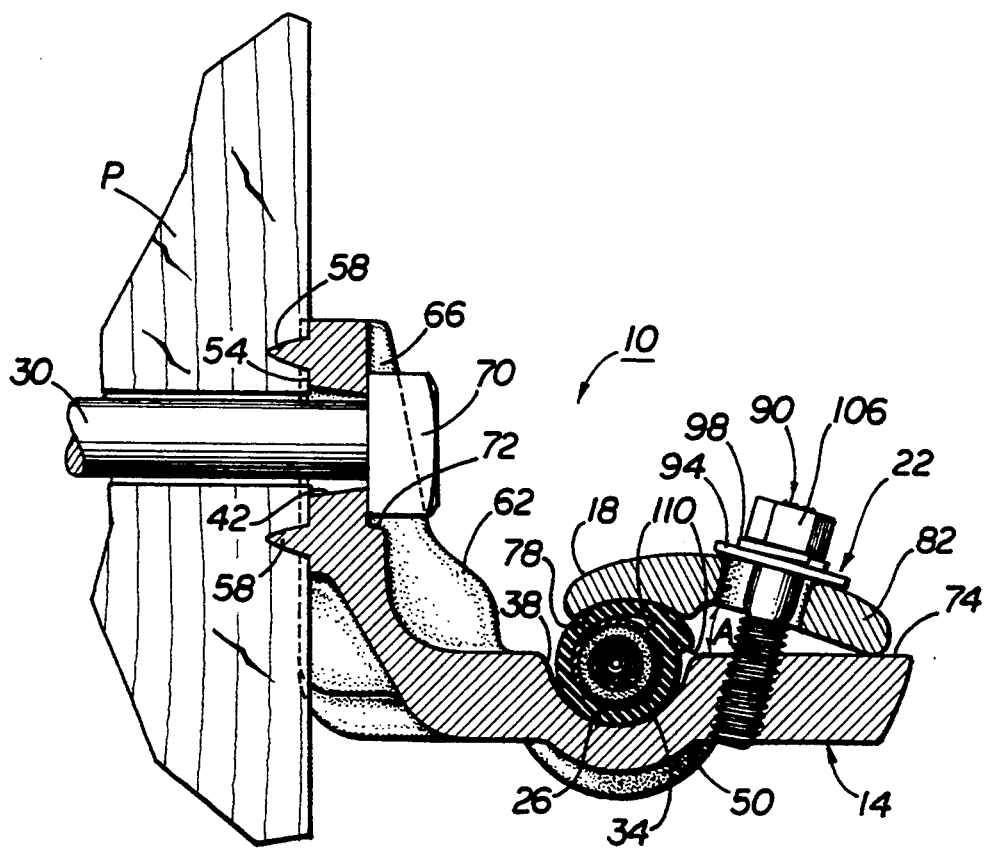
FIG. 4 is a cross-sectional view of the cable support of FIG. 1 shown installed to a utility pole or other structure and taken along lines 4—4 of FIG. 3.

Because body 14 is designed to increase the surface area available for contact with pole P and the strength of that contact, it includes curved back 54 generally complementing the exterior shape of standard cylindrical utility poles. Gains 58, which protrude from back 54, prevent twisting of body 14 during installation and provide additional contact strength by biting into and gripping wooden poles or other similar structures. FIG. 4 most clearly shows these features of cable support 10, illustrating gains 58 embedded in pole P and complete contact between back 54 and the pole P. FIGS. 1-4 also illustrate the relatively constant cross-section of body 14, which facilitates the flow of molten metal or other fluid within a die when body 14 is die cast or formed. Flanges 62 increase the overall strength of body 14, while side walls 66 are spaced slightly greater than the diameter of head 70 of bolt 30 to receive the head 70 and, together with cross wall 72, hold head 70 captive and thereby reduce the likelihood of bolt 30 spinning relative to body 14 during or after installation. Body 14 also includes a relatively flat surface 74 for interaction with keeper 18 and fastener 22, with bore 46 angled relative to surface 74.

Keeper 18 comprises arcuate and rear sections 78 and 82, respectively, and defines opening 86 for receiving fastener 22. Arcuate section 78 contacts cable 34 (and cushion 26 if present) opposite channel 38 and maintains the cable 34 in place when installed in cable support 10. Because the shape of arcuate section 78 generally complements that of cable 34, arcuate section 78 distributes the compressive forces applied to the cable 34 substantially over its entire circumference, avoiding concentrations at any particular points along cable 34. The shape and, when formed of metal, structure of arcuate section 78 also provides sufficient compressive friction on the (typically polyethylene jacket of) cable 34 (or cushion 26 if present) to circumvent the need to apply grit or other loose friction-increasing substances to any portion of cable support 10.

As shown in FIGS. 2 and 4, rear section 82 contacts surface 74 of body 14 when cable 34 is installed. Because rear section 82 and surface 74 are not fitted, however, they may define a variety of angles A between 0°-90° depending on the shape and diameter of cable 34, thereby permitting cable support 10 to accommodate varying diameter cables 34. For many cables 34, angle A is non-zero and nominally between approximately 10°-45° (see, e.g., FIG. 4).

In some embodiments of the invention fastener 22 initially comprises a two-headed bolt 90 and, optionally, may include washers such as flat washer 94 and lock washer 98. When installed, bolt 90 is received by opening 86 and secured to body 14 by threading into bore 46. Upper head 102 (FIG. 1) of bolt 90 is designed to sheer off during installation when cable 34 has been subjected to an appropriate compressive force (FIGS. 2 and 4), nominally 25 foot pounds. By using equivalently-designed bolts 90 throughout a series of cable supports 10, a relatively constant compressive pressure along the supported length of cable 34 can be obtained. Because bolt 90 includes lower head 106, it can later be easily and rapidly loosened from body 14 and keeper 18 rotated away from cable 34 when necessary to provide access to the cable 34 as for replacement or repair.

When cushioning or spacing of cable 34 within channel 38 is desired, cushion 26 may be used as part of cable support 10 to envelope cable 34. A one-piece split tube, cushion 26 is typically formed of an elastomer suitable for absorbing and distributing forces otherwise placed on cable 34. FIGS. 1-2 and 4 also detail use of cushion 26 as a spacer for smaller diameter cable 34, with its ends 110 overlapped to increase the effective diameter of the composite structure to one more closely corresponding to the shapes of channel 38 and arcuate section 78. Together with body 14 and keeper 18, the flexibility of cushion 26 assists cable support 10 in accommodating a wide variety and sizes of cables 34.

The foregoing is provided for purposes of illustration, explanation, and description of embodiments of the present invention. Modifications and adaptations to these embodiments, including but not limited to use of different fastening mechanisms and components formed of varying materials, will be apparent to those skilled in the art and may be made without departing from the scope or spirit of the invention.

I claim:

1. A fiber optic cable support comprising:
    a body defining:
        i. a channel; and
        ii. a bore;
    b. a keeper defining an opening and comprising an arcuate section, the channel and arcuate section defining therebetween a space of adjustable diameter to receive and accommodate fiber optic cable of a variety of sizes;
    c. means, having a variable shape and adapted to conform to the received fiber optic cable, for surrounding and cushioning at least a portion of the fiber optic cable; and
    d. adjustable means, received by the bore and opening, for mounting the keeper on the body so that it can pivot in relation to the body, thereby defining an alterable angle between the keeper and the body and so that adjustment of the adjustable means adjusts the diameter of the space of adjustable diameter by altering said alterable angle.

2. A support according to claim 1 in which the body further defines a curved back including at least one gain, for complementing and gripping a curved structure.

3. A support according to claim 1 in which the surrounding and cushioning means comprises an elastomeric split tube capable of forming tubes of varying diameters.

4. A support according to claim 1 in which the adjustable means comprises a bolt having a head designed to break away when the fiber optic cable has been subjected to a preselected compressive force.

5. A support according to claim 1 in which the body further defines an aperture for receiving a bolt when installing the fiber optic cable support to a structure.

6. A support according to claim 1 in which the body is of approximately constant cross section to facilitate its formation within a die.

7. A cable support comprising:
   a. a body defining;
      i. a channel;
      ii. a bore;
      iii. a first surface surrounding a portion of the bore; and
      iv. a second surface from which at least one gain protrudes;
   b. a keeper defining an opening and comprising:
      i. means, comprising a rear section, for contacting the first surface of the body and forming an alterable angle with the body; and
      ii. an arcuate section connected to the rear section, the channel and arcuate section defining therebetween a space of adjustable diameter to receive and accommodate cable of a variety of sizes, the diameter of the space being adjustable by altering the angle formed between the rear section and the body;
   c. an elastomeric split tube, having a variable diameter and adapted to conform to the received cable, for surrounding and cushioning at least a portion of the cable; and
   d. adjustable means, comprising a two-headed bolt received by the bore and opening, one of its heads being a break-away head, for connecting the keeper to the body so that it can pivot in relation to the body, such that adjustment of the two-headed bolt alters the angle formed between the rear section and the body, thereby adjusting the diameter of the space and securing the cable under a predetermined and limited compressive force.

8. A support according to claim 7 in which the channel has flared ends, for facilitating receipt of the cable.

9. A support according to claim 8 in which the body is of approximately constant cross section to facilitate its formation within a die.

10. A support according to claim 9 in which the rear section of the keeper and first surface of the body form an angle between 0°–90°.

11. A support according to claim 10 in which the rear section of the keeper and first surface of the body form an angle between 10°–45°.

12. A fiber optic cable support capable of supporting fiber optic cable of a variety of sizes and comprising:
   a. a body defining a channel for receiving a fiber optic cable;
   b. a keeper comprising an arcuate section and means for contacting and forming an alterable angle with the body;
   c. cushioning means having a variable shape and adapted to conform to and surround at least a portion of the length of the fiber optic cable and to conform to the channel and arcuate section; and
   d. adjustable means for securing the keeper to the body so that it can pivot in relation to the body, the arcuate section and channel providing a space of adjustable diameter to receive the fiber optic cable and cushioning means, the space of adjustable diameter being adjustable by using the adjustable means to alter said alterable angle between the keeper and the body.

13. A support according to claim 12 in which the cushioning means comprises a jacket of the fiber optic cable.

14. A support according to claim 13 in which the body comprises:
   a. a curved back for complementing a curved structure; and
   b. a through aperture to receive a bolt when fastening the support in complementary relationship to the curved structure.

15. A cable support comprising:
   a. a body defining;
      i. a channel;
      ii. a bore;
      iii. a first surface surrounding a portion of the bore, the bore intersecting the first surface of the body at an angle other than 90°; and
      iv. a second surface from which at least one gain protrudes;
   b. a keeper defining an opening and comprising:
      i. a rear section for contacting the first surface of the body; and
      ii. an arcuate section, the channel and arcuate section defining therebetween a space of adjustable diameter to receive and accommodate cable of a variety of sizes;
   c. an elastomeric split tube, having a variable diameter and adapted to conform to the received cable, for surrounding and cushioning at least a portion of the cable; and
   d. a two-headed bolt, received by the bore and opening, one of its heads being a break-away head, for fastening the keeper to the body and securing the cable under a predetermined and limited compressive force.

16. A fiber optic cable support comprising:
   a. a body defining:
      i. a channel; and
      ii. a bore;
   b. means for defining with the channel a space of adjustably variable diameter to receive and accommodate fiber optic cable of a variety of sizes, which means comprises a keeper defining an opening and having an arcuate section, the keeper and the body being relatively moveable to vary the diameter of the space of adjustably variable diameter;
   c. means, having a variable shape and adapted to conform to the received fiber optic cable, for surrounding and cushioning at least a portion of the fiber optic cable; and
   d. adjustable means, received by the bore and opening, for connecting the keeper to the body so that it can pivot in relation to the body, such that adjustment of the adjustable means adjusts the diameter of the space of adjustably variable diameter.

17. A fiber optic cable support adapted to be secured to a structure and comprising:
   a. a body defining:
      i. a channel;
      ii. a bore; and
      iii. a surface having a first location;
   b. a keeper defining an opening, comprising an arcuate section, and contacting the surface at the first location when in use, the channel and arcuate section defining therebetween a space of adjustable diameter to receive and accommodate fiber optic cable of a variety of sizes;
   c. adjustable means, received by the bore and opening, for pivotally connecting the keeper to the body so that, as adjusted, the adjustable means adjusts the space of adjustable diameter by pivoting the keeper about the first location;
   d. means for securing the body to the structure without rotation of the body; and
   e. means for restraining the body from rotation with respect to the structure.

18. A fiber optic cable support according to claim 17 further comprising means, having a variable shape and adapted to conform to the received fiber optic cable, for surrounding and cushioning at least a portion of the fiber optic cable.

* * * * *